US005131065A

United States Patent [19]

Briggs et al.

[11] Patent Number: 5,131,065

[45] Date of Patent: Jul. 14, 1992

[54] HIGH LUMINANCE AND CONTRAST FLAT DISPLAY PANEL

[75] Inventors: Stewart J. Briggs, Bellevue; Robert J. Spiger, Bothell, both of Wash.

[73] Assignee: The Boeing Company, Seattle, Wash.

[21] Appl. No.: 665,287

[22] Filed: Mar. 6, 1991

[51] Int. Cl.[5] ........ G02B 6/18

[52] U.S. Cl. ........ 385/120; 340/781; 313/497

[58] Field of Search ........ 350/96.10, 96.24–96.27; 250/227.20, 227.28; 313/497

[56] References Cited

U.S. PATENT DOCUMENTS

| | | | |
|---|---|---|---|
| 4,170,772 | 10/1979 | Bly | 340/781 |
| 4,344,668 | 8/1982 | Gunther et al. | 350/96.27 |
| 4,486,760 | 12/1984 | Funada et al. | 346/107 |
| 4,558,255 | 12/1985 | Genovese et al. | 250/227.2 |
| 4,573,082 | 2/1986 | Jeskey | 358/250 |
| 4,598,228 | 7/1986 | Obata et al. | 313/475 |
| 4,654,558 | 3/1987 | Obata et al. | 313/372 |
| 4,684,846 | 8/1987 | Duchenois et al. | 313/475 |
| 4,743,090 | 5/1988 | Reidinger | 350/96.27 |
| 4,820,013 | 4/1989 | Fuse | 350/96.27 |

*Primary Examiner*—Akm E. Ullah

*Attorney, Agent, or Firm*—Christensen, O'Connor, Johnson & Kindness

[57] ABSTRACT

A flat display panel (53) including a sandwich of thin film layers (52) with indices of refraction that increase the luminance and contrast of the display is disclosed. The sandwich of thin film layers (52), progressing backward from the front major surface of the sandwich, includes a front electrode layer (56), a front dielectric layer (58), a phosphor layer (60), a back dielectric layer (62), and a back electrode layer (64). The index of refraction of the front dielectric layer (58) is greater than or equal to the index of refraction of the phosphor layer (60), such that nearly all light rays projecting forward from the phosphor layer (60) pass into the front dielectric layer (58). The front electrode layer (56) can comprise relatively wide transparent strips, separated by small distances, or the front electrode layer (104) can comprise narrow strips (106) that are opaque and highly conductive. In the latter case, the front dielectric layer (58') extends between the narrow strips (106) and includes doped portions (110) that are conductive. The front major surface of the sandwich of thin film layers is covered by a protective faceplate (54). The faceplate (54) comprises a plurality of optical fibers extending from the back major surface of the faceplate to the front major surface of the faceplate. The fiber-optic faceplate (54) directs light rays projecting from the sandwich (52) to a viewer. The flat panel display (53) so directs light induced in the phosphor layer (60) that the image projecting from the faceplate (54) is very similar in luminance and contrast to the image induced in the phosphor layer (60).

27 Claims, 7 Drawing Sheets

Fig. 5B.
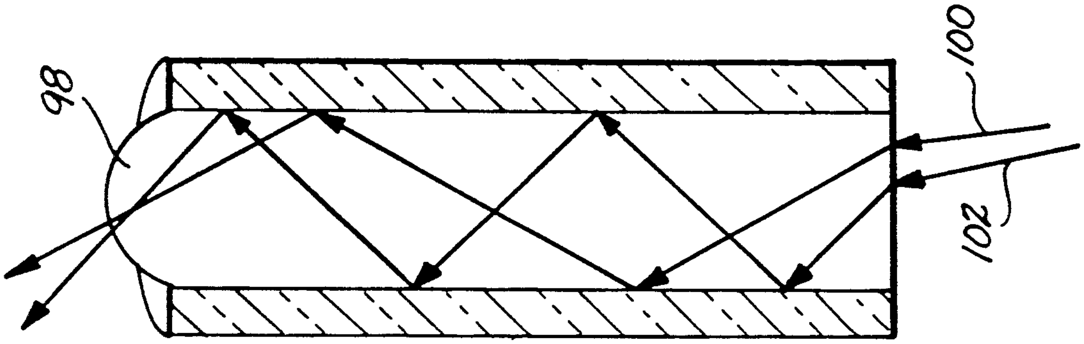
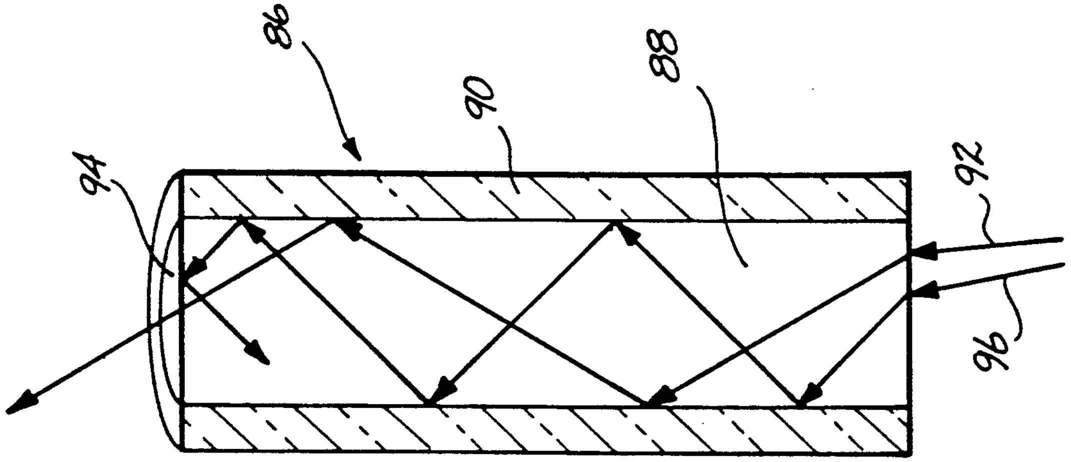
Fig. 5A.

HIGH LUMINANCE AND CONTRAST FLAT DISPLAY PANEL

FIELD OF THE INVENTION

This invention is directed to flat panel displays and, more particularly, thin film electroluminescent displays.

BACKGROUND OF THE INVENTION

Thin film electroluminescent (TFEL) displays are solid-state flat panel displays available in a variety of colors that encompass a small volume relative to the display surface area. TFEL displays include electronic drive circuitry that creates images in a flat display panel comprising a sandwich of thin film layers opposing a transparent protective faceplate. The sandwich of thin film layers includes front and back electrode layers separated by front and back dielectric layers and a central phosphor layer (luminescent). The drive circuitry creates a luminescent image in the phosphor layer. Light rays, originating in the phosphor layer and projecting from the front surface of the faceplate, allow the image to be seen by a viewer. The display panel is typically formatted as an X-Y matrix of pixels. The electrode layer construction and drive circuitry support the application of individual voltage differences between the two electrode layers at each pixel location. A voltage difference between the electrodes at a particular pixel excites the portion of the phosphor layer within the pixel area, causing the pixel area of the phosphor layer to become luminous. An image is created by the matrix of luminous/nonluminous pixels. The drive circuitry sequentially processes the pixels row-by-row, exciting the appropriate pixels to create the desired image. The luminance of a pixel is proportional to its level and/or its frequency of excitation. As the number of rows of pixels increases, the period of time that can be spent exciting a particular pixel decreases, and therefore the electrical current the drive circuitry applies to the electrodes must increase to achieve the same level of average pixel luminance. Ultimately, the luminance of the display is limited by the current capacity of the drive circuitry, which is related to the ability of the display panel to dissipate heat.

The maximum luminance of presently available TFEL displays is insufficient in certain environments of high ambient light. In addition to being limited by the current capacity of drive circuitry, the luminance of TFEL displays is limited by their low efficiency; the ratio of light energy emitted from the faceplate of a TFEL display to the unit input energy applied to the display's drive circuitry is low, e.g., 1%. Before recent improvements, e.g., development of phosphors with greater luminous efficiency, the efficiency of TFEL displays was even worse. While TFEL displays have improved, a mechanism that creates a significant loss of light energy remains. Specifically, because the dielectric layers adjacent to the phosphor layer of a conventional TFEL display panel have lower indices of refraction than the phosphor layer, light rays originating in the phosphor layer are either reflected at the dielectric/phosphor layer interfaces or pass into the dielectric layers. As a result, a significant portion of the light rays produced are reflected at the dielectric/phosphor layer interfaces and trapped in the phosphor layer, sequentially reflecting between the front dielectric layer/phosphor layer interface and the back dielectric layer/phosphor layer interface. Such light rays are channeled laterally in the phosphor layer and are eventually emitted out a side of the display panel. Thus, they do not contribute to the viewable image.

The just-described mechanism of light energy loss also causes a decrease in contrast. Not all reflected light rays reflect continuously in the phosphor layer until being emitted from a side of the display panel. A significant percentage of light rays that reflect at two or more layer interfaces are emitted from the front surface of the faceplate. Such randomly emitted light rays reduce the contrast of the image produced by the display. Contrast is reduced because these light rays, which are internally channeled laterally from their point of origin in the phosphor layer, are emitted from the surface of the faceplate at a different position and angle than would have occurred if the light rays were not internally reflected. Thus, they appear to have originated from a different position in the phosphor layer. The result is a reduced contrast image.

The present invention is directed to providing a display panel that exhibits a lower percentage of internally reflected light rays and, therefore, provides greater luminance and better contrast than prior art display panels.

SUMMARY OF THE INVENTION

In accordance with this invention, a TFEL display panel including a sandwich of thin film layers for producing high luminance and high contrast images is provided. The layers of the sandwich, progressing backwards from the front surface of the sandwich, include a front electrode layer, a front dielectric layer, a phosphor layer, a back dielectric layer, and a back electrode layer. The phosphor layer is adjacent to the front and back dielectric layers. The front dielectric layer has an index of refraction not less than the index of refraction of the phosphor layer. The result is that essentially all light rays projecting from within the phosphor layer towards the front surface of the sandwich pass through the front dielectric layer, i.e., essentially none of these light rays are reflected back into the phosphor layer.

In accordance with further aspects of the present invention, the front electrode layer may comprise narrow strips that are opaque and highly conductive. The narrow strips lie parallel to one another and, preferably, are separated by distances that are large in comparison to the width of each of the narrow strips. The front dielectric layer extends between the narrow strips. The dielectric extensions between the narrow strips are partially doped to form conductive areas connected to the narrow strips, so that the narrow strips and doped extensions together provide electrodes that are separated by small distances and are substantially transparent. A front electrode layer constructed according to these further aspects of the invention is more conductive than presently used transparent electrodes, e.g., electrodes comprising strips of indium tin oxide.

In accordance with still further aspects of the present invention, in contrast with the glass faceplates commonly used in present TFEL display panels, a fiber-optic faceplate is used as a protective faceplate for the front surface of the sandwich of thin film layers. The fiber-optic faceplate is comprised of a matrix of optic fibers extending from the faceplate back surface to the faceplate front surface. Fiber-optic faceplates better direct light rays from the front surface of the sandwich to the front surface of the plateplate, i.e., the optical fibers prevent light rays from traveling laterally in the faceplate. Preferably, cores of the optical fibers are rounded and protrude from the faceplate front surface so as to reduce the percentage of light rays that are reflected at the faceplate front surface back into the faceplate; this would also increase the angle at which the display can be acceptably viewed.

As will be appreciated from the foregoing brief summary, a TFEL display panel formed in accordance with the invention provides higher luminance and better contrast images than prior art TFEL displays. This result is achieved because prior art TFEL display panels lose a significant amount of light energy out the sides of the panels due to successive internal reflections. This loss makes such prior art TFEL display panels produce images having insufficient luminance to be viewable in areas of high ambient light. Because the internal reflections of display panels formed in accordance with the present invention are minimal, a high percentage of the light rays produced by the phosphor layer is directed out of the front surface of the faceplate, thereby producing a high luminance image. The internal reflections within prior art TFEL display panels also reduce the contrast of the images produced by these display panels. Conversely, the image emitted from the faceplate of a display panel formed in accordance with the present invention has a contrast very close to that of the image induced in the phosphor layer. In summary, a display panel formed in accordance with the present invention emits an image that is very close in contrast and luminance to the image created in the phosphor layer.

BRIEF DESCRIPTION OF THE DRAWINGS

The foregoing features and advantages will be better understood from the following description of preferred embodiments of the present invention when taken in conjunction with the accompanying drawings wherein:

FIG. 5A is a longitudinal cross-sectonal view of an optical fiber that may be used to form the faceplate of the display panel shown in FIG. 3, and FIG. 5B is a longitudinal cross-sectional view of an optical fiber with a protruding core, which is preferred for the front surface of the faceplate.

DESCRIPTION OF PREFERRED EMBODIMENTS

Figure 1:
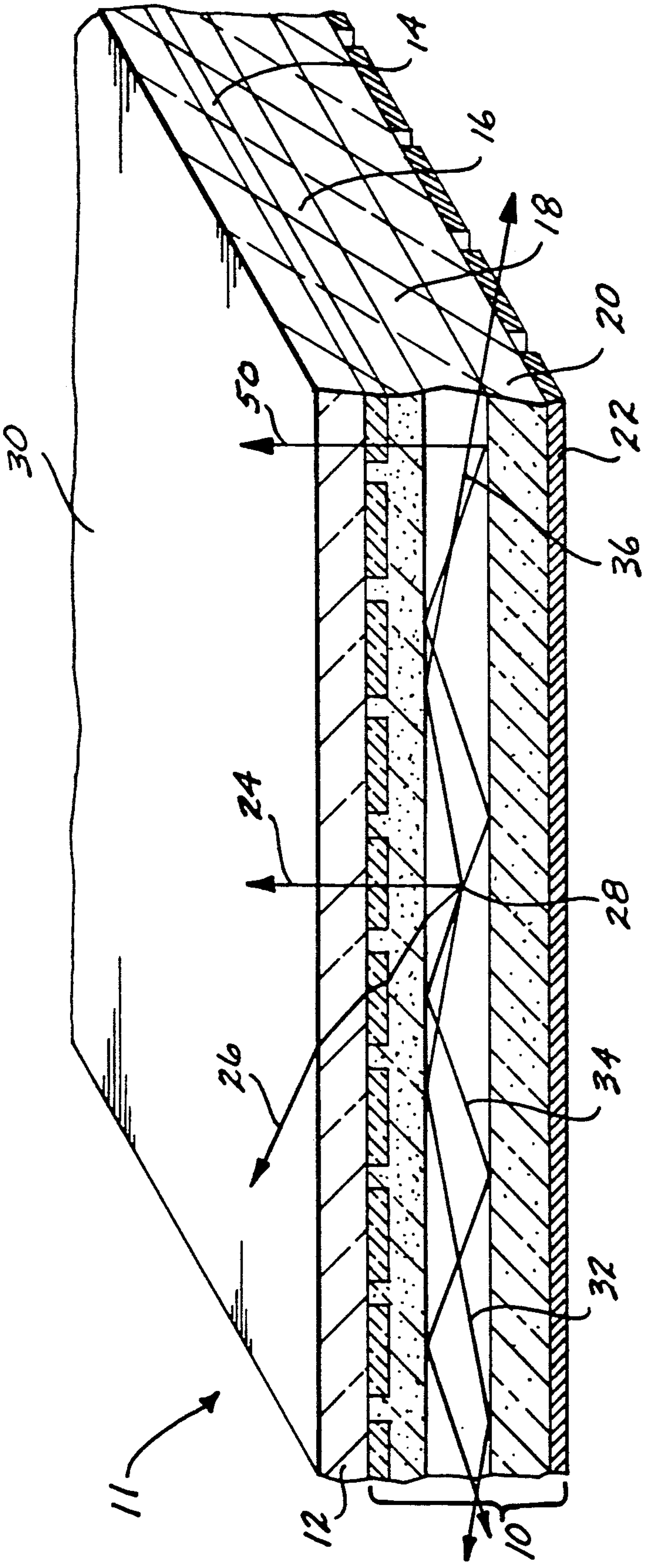
FIG. 1 is a side cross-sectional view of a prior art TFEL display panel with illustrative light rays therein.

The present invention provides a thin film electroluminescent (TFEL) display panel that is capable of producing images of higher luminance and contrast than that of prior art TFEL display panels. A TFEL display panel 11 formed in accordance with the prior art is shown in FIG. 1. The TFEL display panel 11 illustrated in FIG. 1 is flat and includes a sandwich of thin film layers 10 and a protective faceplate 12. Progressing backwards from the faceplate 12, the sandwich 10 comprises a front electrode layer 14, a front dielectric layer 16, a phosphor layer 18, a back dielectric layer 20, and a back electrode layer 22.

The front electrode layer 14 is formed by a series of parallel, spaced-apart electrodes. The back electrode layer 22 is also formed by a series of parallel, spaced-apart electrodes. The front layer electrodes lie orthogonal to the back layer electrodes. Pixel points are located where the front and back layer electrodes cross.

The front electrode layer 14 is transparent; the front dielectric layer 16, the phosphor layer 18, the back dielectric layer 20, and the faceplate 12 are also transparent. Images are created by the phosphor layer in response to voltage differences between the front and back electrodes. More specifically, the voltages create electroluminescence in the phosphor layer 18 at the pixel points. A set of pixel point light emissions create an image. Light rays projecting from the phosphor layer through the front dielectric layer 16, the front electrode layer 14, and the faceplate 12 produce an image that can be seen by a viewer.

Prior art TFEL display panels have limited luminance and contrast capability, in part because of internal reflection of light rays within the display panel. Light rays projecting from a point of excitation 28 in the phosphor illustrate how luminance and contrast are lost. Some of the light rays 24 project from the point of excitation 28 directly out of the front surface 30 of the faceplate and create a viewable image. In contrast, other light rays 26 are refracted before being emitted out of the front surface 30 of the faceplate. These light rays may slightly reduce the contrast of the image. Still other light rays 32, 34 and 36 are channeled laterally in the phosphor layer 18 through a series of internal reflections at the phosphor/front dielectric layer interface and the phosphor/back dielectric layer interface. These light rays do not contribute to the luminance of the image.

Figure 2:
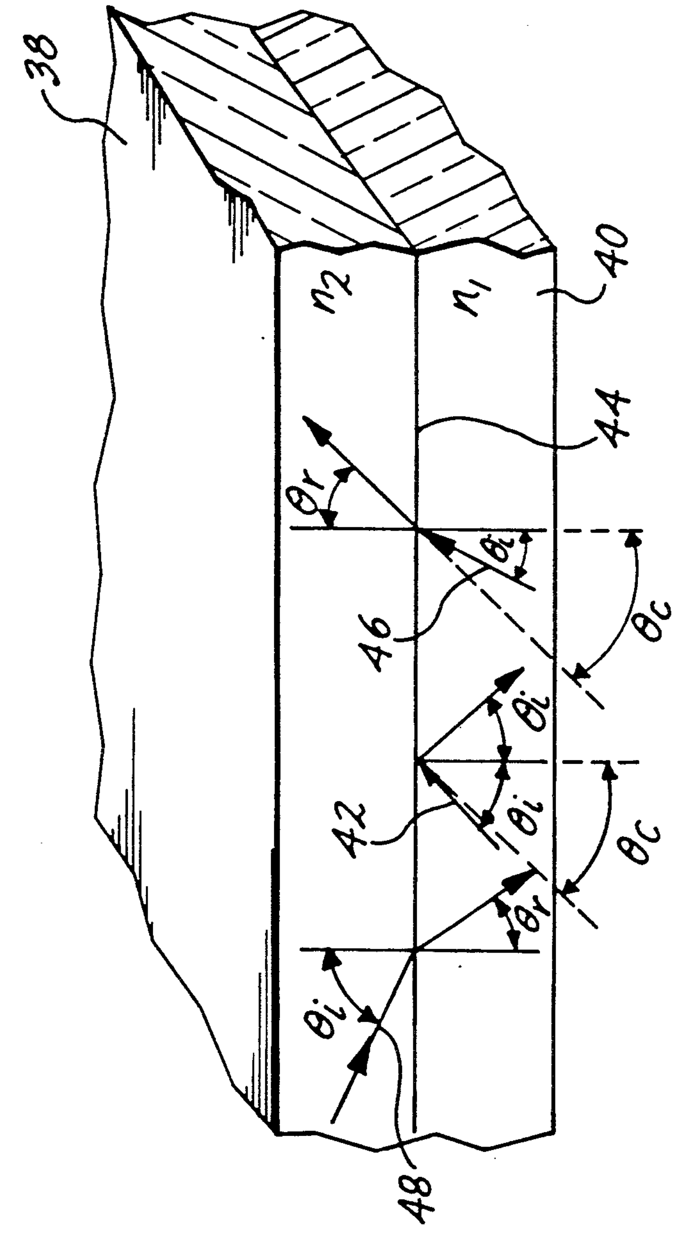
FIG. 2 is a side cross-sectional view of two juxtaposed transparent plates with illustrative light rays therein.

The axis of the reflected light rays 32, 34 and 36 and the refracted light light ray 26 are changed at the phosphor/dielectric interfaces because the phosphor layer has a higher index of refraction than the dielectric layers, as explained next with reference to FIG. 2. FIG. 2 illustrates the well-known optical laws, known collectively as Snell's Law, that govern the reflection and refraction of light rays. In FIG. 2, a front plate 38 is shown stacked on top of a back plate 40, forming an interface 44 between the plates. The front plate 38 has an index of refraction, $n_2$, which is less than the index of refraction, $n_1$, of the back plate 40. The plate interface 44 has a characteristic critical angle, $\theta_c$, that defines the reflective and refractive characteristics of the interface 44. The critical angle, $\theta_c$, is measured from a line perpendicular to the interface 44. Any light ray 42 within the back plate 40 (the higher index of refraction plate) that intersects the interface 44 at an angle of incidence, $\theta_i$, (also measured from the interface normal) that is greater than the critical angle, $\theta_c$, is reflected by the interface 44 at the same angle, $\theta_i$. Any light ray 46 within the back plate 40 that intersects the interface 44 at an angle of incidence, $\theta_i$, that is less than the critical angle, $\theta_c$, is refracted into the front plate 38 at an angle of refraction, $\theta_r$. The light ray 46 is bent away from the normal, i.e., somewhat sideways, upon passing into the front plate 38 (the lower index of refraction plate). Quantitatively, the angle of refraction, $\theta_r$, also measured from the interface normal, is greater than the angle of incidence, $\theta_i$. Essentially any light ray 48 within the front plate 38 that intersects the interface 44 at any angle of incidence, $\theta_i$, is refracted into the back plate 40 at an angle of refraction, $\theta_r$, less than the angle of incidence, $\theta_i$, i.e., the light ray is bent towards the interface normal upon entering the higher index of refraction material.

Returning to FIG. 1, not all light rays reflected within the phosphor layer successively reflect at the phosphor/dielectric interfaces until channeled out the sides of the display panel. Some light rays are scattered after being channeled laterally a distance in the phosphor layer, and such light rays further reduce the contrast of the display. The light ray 50 shown in FIG. 1 is exemplary of such light rays. The light ray 50 originates from the point of excitation 28 and is channeled to the right with two successive phosphor/dielectric interface reflections. Upon being incident at the phosphor/back dielectric layer interface for the second time, the light ray 50 is scattered. The scattering shown causes a part of the light ray 50 to project frontward, nearly perpendicular to the layer interfaces. Thus, the light ray passes through the front layers and out the front surface of the faceplate. Scattered light rays, such as light ray 50, reduce the contrast of the image produced by the display panel because these light rays, as seen by a viewer, appear to project from locations in the phosphor layer other than their actual point of origination. That is, these light rays cause the image seen by the viewer to be somewhat different from the image excited in the phosphor layer by the voltage applied to the electrodes. Because the percentage of scattered light rays relative to the emitted light rays is not small, the effect on the contrast of the image can be significant.

Figure 3:
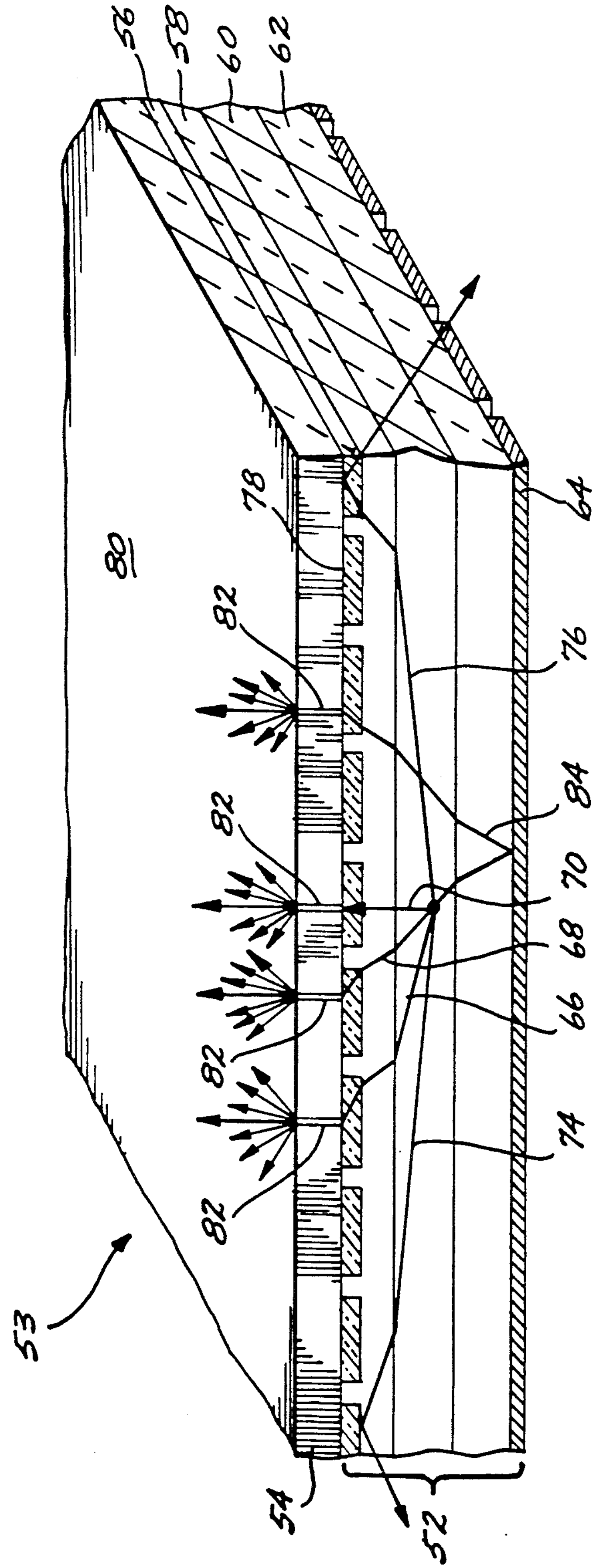
FIG. 3 is a side cross-sectional view of a preferred embodiment of the present invention with illustrative light rays therein.

The display panel 53 shown in FIG. 3, which is formed in accordance with the present invention, has greater luminance and contrast capability than prior art TFEL display panels. As in the prior art display panel 11 shown in FIG. 1, the display panel 53 includes a sandwich of thin film layers 52 and a protective faceplate 54. Progressing backward from the protective faceplate, the sandwich 52 comprises a front electrode layer 56, a front dielectric layer 58, a phosphor layer 60, a back dielectric layer 62, and a back electrode layer 64. The display panel 53 exhibits a higher luminance than the prior art display panel 11, in part because essentially no forward traveling light rays are reflected at the phosphor layer/front dielectric layer interface. Rather, essentially all forward projecting rays within the phosphor layer 60 are refracted into the front dielectric layer 58, and a high percentage of these light rays continue forward, passing through the front electrode layer 56 and the faceplate 54. See light rays 66, 68 and 70, for example. Forward projecting light rays are not reflected at the phosphor layer/front dielectric layer interface because, in contrast to prior art flat display panels of the type illustrated in FIG. 1, the chosen front dielectric layer 58 has an index of refraction that is greater than or equal to the index of refraction of the phosphor layer 60.

As noted above, FIG. 3 illustrates an embodiment of the invention in which the front dielectric layer 58 has a higher index of refraction than that of the phosphor layer 60. As a result, light rays are bent towards the normal of the phosphor layer/front dielectric layer interface upon passing from the phosphor layer into the front dielectric layer. In contrast, the front electrode layer 56 has an index of refraction less than that of the front dielectric layer 58, and the index of refraction of the faceplate 54 is less than the index of refraction of the front electrode layer 56. As a result, some forward projecting light rays, e.g., light ray 74, are reflected at the front dielectric layer/front electrode layer interface, and other forward projecting light rays, e.g., light ray 76, are reflected at the front electrode layer/faceplate interface.

In accordance with the invention, preferably, the protective faceplate 54 shown in FIG. 3 comprises a matrix of optical fibers. The fiber-optic faceplate 54 can be formed of either type of optical fiber shown in FIG. 5, and discussed below. The optical fibers provide a plurality of optical paths between the back major surface 78 of the faceplate and the faceplate's front major surface 80. The optical fibers 82 direct light rays from the back major surface of the faceplate to the front major surface of the faceplate in a way that prevents the light rays from traveling laterally in the faceplate and reducing the luminance and contrast of an image. More specifically, any light rays that enter an optical fiber 82 are directed forward via a series of reflections within the optical fiber, until being emitted from the front surface 80. The direction of the light ray emitted from the optical fiber 82 depends on the angle at which the light ray 66 enters the optical fiber and the series of reflections that occur in the optical fiber. The darkened ray shown in FIG. 3 as projecting from the optical fiber 82 is exemplary of the general direction at which light rays are emitted from the optical fiber 82.

Figure 4:
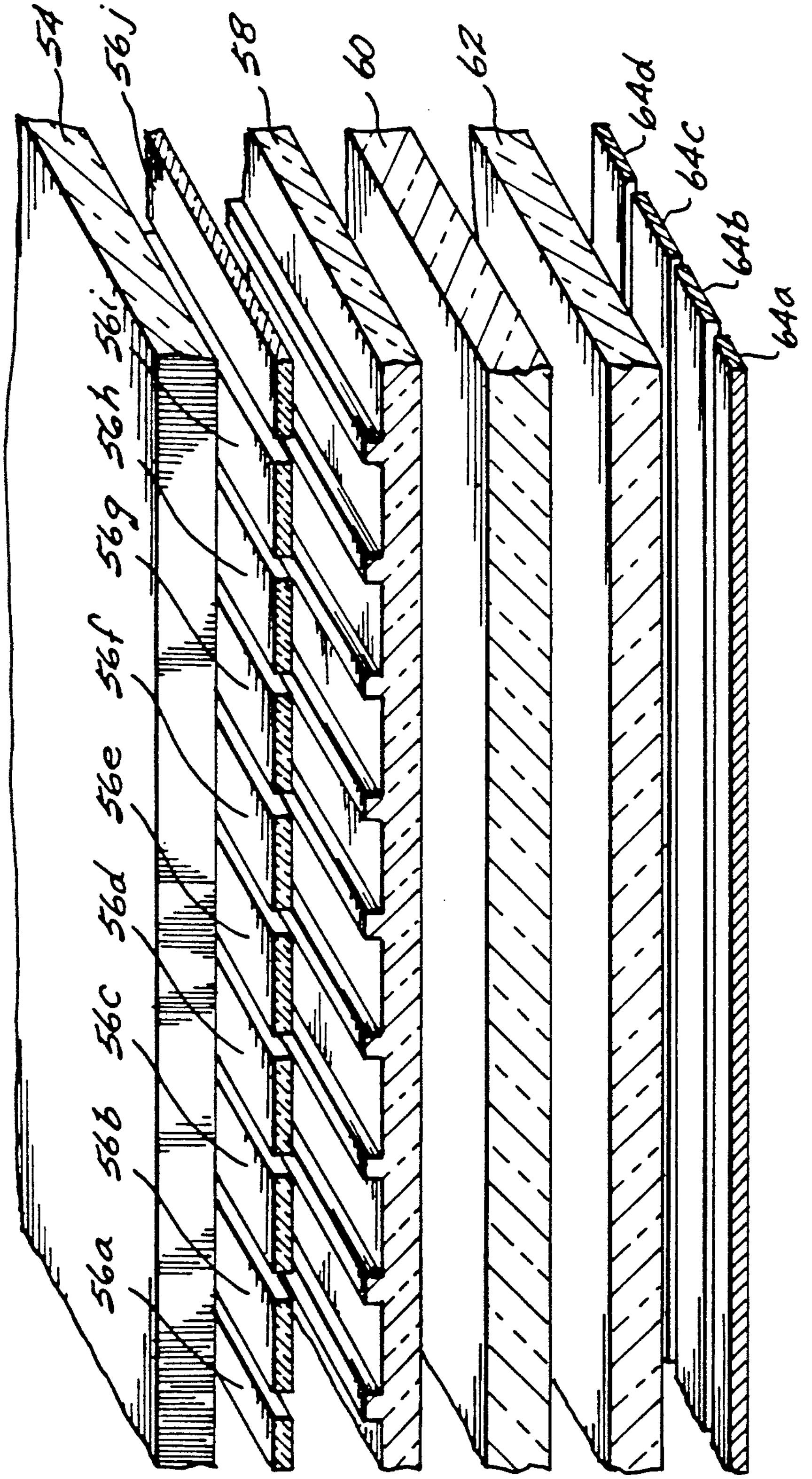
FIG. 4 is an exposed view of the display panel shown in FIG. 3.

FIG. 4 is an exploded view of the TFEL display panel shown in FIG. 3. As shown best in FIG. 4, the front electrode layer 56 comprises a plurality of electrode strips 56*a*, 56*b*, 56*c* . . . lying parallel to one another. The electrode strips are transparent and separated by small distances relative to the width of each strip. The back electrode layer 64 also comprises a plurality of electrode strips 64*a*, 64*b*, 64*c* . . . lying parallel to one another and separated by small distances relative to the width of each strip. The back electrode layer strips are oriented perpendicular to the front electrode strips. Thus, together the strips of the front and back electrode layers 56 and 64 divide the display panel into a matrix of pixels. As is common in the flat panel display technological area, drive circuitry connected to the front and back electrode strips 56*a*, 56*b*, 56*c*, . . . and 64*a*, 64*b*, 64*c* . . . sequentially and repetitively control luminescent excitation of the phosphor layer 54 at each pixel location by controlling the voltage difference between the strips defining the pixel locations. For example, a large voltage difference between a specific front electrode strip 56*a* and a back electrode strip 64*a* causes excitation of the phosphor layer 60 at the pixel location defined by the intersection of these two strips. Thus, the phosphor layer at this pixel location would become luminous. The luminance of the pixel would depend on the magnitude and frequency of the voltage difference between the strips.

The back electrode strips are preferably formed of a reflective material that is conductive, e.g., aluminum. Preferably, the back dielectric layer 62 is formed of a transparent material. As a result, light rays projecting rearward from the phosphor layer 60 pass through the back dielectric layer 62 and are reflected by the back electrode layer 64. The reflected light rays project forward through the back dielectric layer 62, followed by the phosphor layer 60 and the front dielectric layer 58. In this manner, rearward directed light rays tend to be projected out of the faceplate 54 and therefore would contribute to the luminance of the display.

A significant percentage of the rearward projected light rays would be reflected forward at the phosphor layer/back dielectric layer interface if, as in the prior art, the back dielectric layer 62 had a lower index of refraction than the phosphor layer 60. This percentage of light rays will either be lost to image luminance or result in contrast reducing scattering. The invention avoids this undesirable result by, preferably, forming the back dielectric layer 62 of a material having an index of refraction that is greater than or equal to the index of refraction of the phosphor layer 60. The result is that rearward projected light rays are reflected forward at the back electrode layer 64 rather than the phosphor layer/back dielectric layer interface. Forward reflection at the back electrode layer is more desirable because the back electrode layer has more consistent reflective properties. FIG. 3 illustrates the path rearward projected light ray 84 follows in an embodiment in which the back dielectric layer 62 has a greater index of refraction than that of the phosphor layer 60. The light ray 84 passes into the back dielectric layer 62 and is reflected at the reflective surface of the back electrode layer 64. The light ray 84 is reflected forward, through the back dielectric layer 62, the phosphor layer 60 and the front dielectric layer 58.

The sandwich of thin film layers 52 can be formed using processes and techniques previously used to create TFEL display panels. For example, the faceplate 54 can serve as the substrate and the sandwiches of thin film layers can be built up on the faceplate using a series of chemical vapor deposition steps and etching steps. The front electrode layer 56 would be first deposited and etched to form the conductive strips of the electrode. Then the remaining layers would be sequentially formed. The front dielectric layer 58 extends between the separations in the front electrode layer strips because the front dielectric layer is deposited after the strips are formed.

Excluding the dielectric layers, the layers of the sandwich 52 can be formed of substances previously used to form TFEL display panels. For example, the phosphor layer could be formed of a zinc and sulphur compound. The back electrode layer could be formed of aluminum, which has the desired reflective characteristics. The front electrode layer 56 could be formed of indium tin oxide (ITO). ITO is both conductive and transparent. A phosphor layer formed of zinc sulfide (ZnS) would have an index of refraction of approximately 2.3. Few dielectric substances having an index of refraction that is greater than or equal to that of ZnS are available. Diamond is one dielectric substance that has a higher index of refraction than ZnS; the index of refraction of diamond is approximately 2.4. Recently, methods of depositing carbon vapor to form a thin layer of diamond have become available. Thus, diamond is one substance that can be used to form the front dielectric layer when the chosen phosphor is ZnS. As mentioned previously, the back dielectric layer is also preferably formed of a substance having an index of refraction that is greater than or equal to that of the phosphor layer. Thus, diamond is one substance that can be used to form the back electrode layer when the chosen phosphor is ZnS.

As discussed previously, the use of a fiber-optic faceplate 54 to direct light rays from the back major surface 78 of the faceplate to the faceplate's front major surface 80 improves luminance and contrast when compared to TFEL display panels using an optically isotropic glass faceplate. FIG. 5A illustrates how light rays are directed by an optical fiber 86. Optical fibers 86 comprise a transparent core 88 and an outer clad 90, which is also preferably transparent. The index of refraction of the core 88 is preferably significantly higher than the index of refraction of the clad 90. As a result, light rays traveling in the core are reflected at the core/clad interface. For example, a light ray 92 that enters the core in an upward direction is continuously reflected upwardly at the core/clad interface until it is emitted from the front surface 94 of the core. The light ray is bent away from the normal of the surface 94 upon being emitted from the core 88 into air, because air has a lower index of refraction than that of the core. Light rays, such as light ray 96, that are incident at the front surface 94 at a relatively large angle of incidence with respect to the surface normal, i.e., at an angle of incidence greater than the characteristic critical angle of the interface, are reflected and projected rearward in the core towards the sandwich of thin film layers 52. Such light rays reduce the luminance and contrast of the image produced by the display panel, and are therefore undesirable.

Reflections at the core/air interface, i.e., the front surface 94, can be significantly reduced by forming the end of the core that is exposed to the air in the manner shown in FIG. 5B. In FIG. 5B, the core 88 protrudes from the clad 90 at the end exposed to air, i.e., the end of the optical fiber that is on the front major surface 80 of the fiber-optic faceplate 54. The protruding end 98 is curved into a suitable shape, preferably a hemispherical shape. The curvature of the end 98 reduces the percentage of light rays that impinge on the core/air interface at an angle greater than the characteristic critical angle of the interface. As a result, light rays that would be reflected if the interface were flat pass through the interface.

In addition to increasing the luminance and contrast of the image, the curvature of the end 98 increases the angle at which the display can be acceptably viewed. This increased viewing angle is a result of light rays being emitted from the surface 80 at a greater range of angles. The mechanism that reduces the percentage of light rays that are reflected at the core/air interface is qualitatively described next.

The majority of light rays traveling substantially parallel to the core 88 are emitted from the protruding end 98 because only light rays close to the sides of the core are incident at the core/air interface at a relatively wide angle of incidence. Light rays traveling at an angle within the core are generally incident at the core/air interface towards a side of the protruding end 98 that is geometrically oriented such that these rays pass through the core/air interface. For example, the geometry of the core dictates that light rays incident towards the left side of the end 98 project from the right side of the core. The light rays 100 and 102 (which enter at angles similar to light rays 92 and 96, respectively, in FIG. 5A) illustrate this. The light ray 100, which projects from the right side of the core 98, is nearly normal to the core/air interface, and is therefore emitted into the air. The light ray 102 travels generally the same path as the light ray 96 in FIG. 5A. Because of the curved surface of the end 98, the light ray 102 is emitted into the air, instead of being reflected back into the core as was the light ray 96.

Fiber-optic plates comprised of optical fibers as shown in FIG. 5A are widely available. The optical fibers are melded together so that no spaces exist between the optical fibers. The ends of the optical fibers on the front major surface of the faceplate 54 can be formed as shown in FIG. 5B by, for example, treating the front major surface of the faceplate with a chemical solution that eats away some of the cladding 90. If the chosen chemical solution is only slightly reactive with the core 88, it will round the end 98 of the core.

Figure 6:
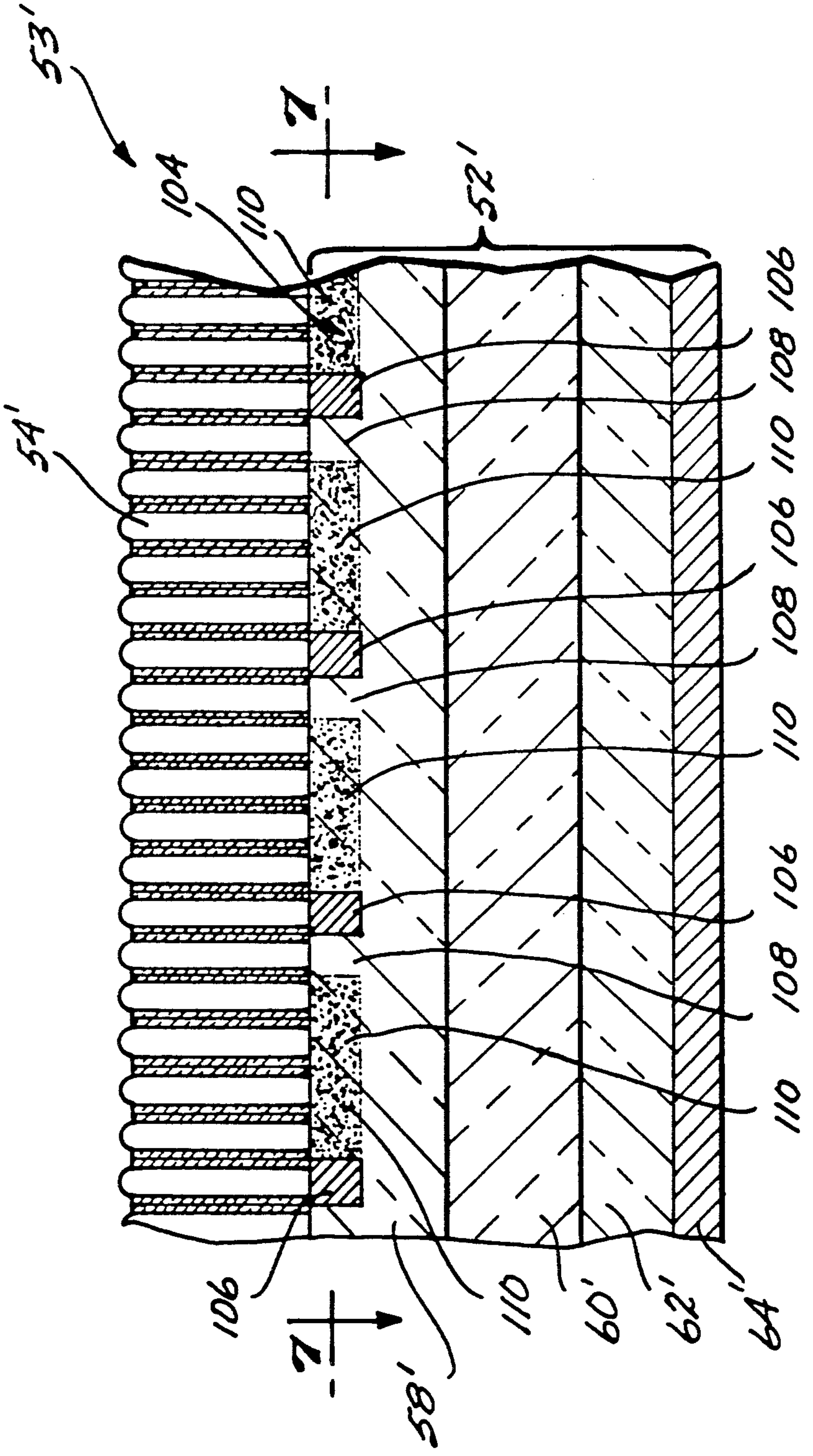
FIG. 6 is a side cross-sectional view of a TFEL display panel formed in accordance with the present invention that incorporates narrow opaque strips rather than wide transparent electrodes.

FIG. 6 shows a display panel 53' having a front electrode layer 104 formed in accordance with alternative aspects of this invention. The front electrode layer 104 comprises a plurality of narrow strips 106 that are highly conductive and opaque. The strips 106 lie parallel to one another and orthogonal to the strips that form the back electrode layer 64. Further, the narrow strips 106 are separated by distances that are substantially greater than the width of each of the strips 106. The front dielectric layer 58' extends into the space between the narrow strips 106. A portion 110 of the dielectric extensions adjacent to each strip 106 is partially doped with a material that renders the portion 110 conductive. For example, if the front dielectric layer 58' is formed of diamond, the p-type dopant boron can be used. The doped portion 110 of each dielectric extension is electrically connected to an adjacent associated strip 106, such that electrical continuity exists between the strip and the doped portion. A nondoped region 108 exists between the edge of the doped portions 110 and the next adjacent strip.

Figure 7:
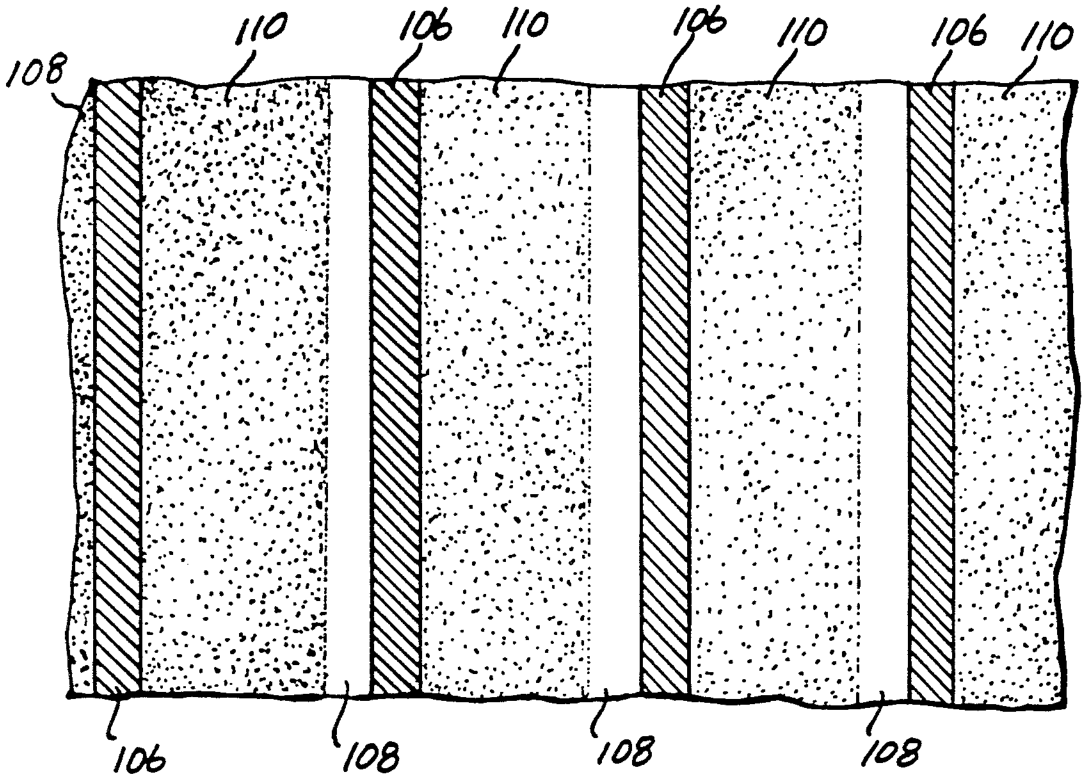
FIG. 7 is a cross-sectional view taken along line 7—7 of FIG. 6 showing in more detail the front electrode layer used in the embodiments of the invention shown in FIGS. 4 and 6.

FIG. 7 is a plan view of the front electrode layer 104. The doped portion 110 of each dielectric extension runs parallel to an adjacent strip 106 and is connected thereto. The dielectric extensions, including the doped portions 110, are transparent. The narrow strips 106, which could be formed of aluminum, are highly conductive. As a result, the voltage along the length of each strip 106 is substantially constant. Because the strips 106 are narrow, most of the light rays generated at the pixel locations by the strip/doped portions that form the front electrode layer 104 and the strips that form the back layer 64' when a suitable voltage is applied to the strips pass through the separations between the front electrode strips 106. In effect, the doped portions 110 extend the width of the strips 106. Without the doped portions, the pixels would be small and separated by relatively large distances.

A front electrode layer 104 formed of narrow strips and doped portions of dielectric material is more conductive than is a front electrode layer 56 of the type shown in FIGS. 3 and 4, i.e., a front electrode layer formed of currently available ITO strips. ITO strips are transparent but are not highly conductive and thus the voltage along the length of an ITO strip can vary, which affects the luminance and contrast of an image produced by a display panel. The remaining portions of the display panel 53' shown in FIG. 6 can be formed with processes similar to those discussed with reference to the flat display panel 53 shown in FIGS. 3 and 4. The fiber-optic faceplate 54 shown in FIG. 6 illustrates more clearly the protruding ends of the optical fiber cores.

While a preferred embodiment of the invention has been illustrated and described, it will be appreciated that various changes, in addition to those previously mentioned herein, can be made therein without departing from the spirit and scope of the invention. For example, the ends of the optical fibers on the back major surface of the faceplate 54 can be pitted, i.e., recessed in a hemispherical shape to further increase the amount of received light transmitted through the optical fibers. The front electrode layer strips would extend into the core pits, as would the front dielectric material extending into the separations between the strips. Pitting of the back ends of the optical fiber cores improves the optical acceptance of light rays incident at the back major surface of the faceplate 54, i.e., the percentage of light rays passing through the back major surface of the faceplate is increased. As a result, the total amount of light passing through the optical fibers is increased. Thus, within the scope of the appended claims it is to be understood that the invention can be practiced otherwise than as specifically described herein.

The embodiments of the invention in which an exclusive property or privilege is claimed are defined as follows:

1. A flat display panel comprising:

(a) a phosphor layer;

(b) a back electrode layer located on one side of said phosphor layer;

(c) a back dielectric layer located between said back electrode layer and said phosphor layer;

(d) a front electrode layer located on the other side of said phosphor layer; and (e) a front dielectric layer located between said front electrode layer and said phosphor layer, the index of refraction of said front dielectric layer being not less than the index of refraction of said phosphor layer.

2. The flat display panel claimed in claim 1, wherein the index of refraction of said back dielectric layer is not less than the index of refraction of said phosphor layer.

3. The flat display panel claimed in claim 1 or 2, wherein said front dielectric layer is formed of diamond.

4. The flat display panel claimed in claim 3, wherein said back dielectric layer is formed of diamond.

5. The flat display panel claimed in claim 1, further comprising a fiber-optic faceplate located in front of said front electrode layer, said fiber-optic faceplate having a front major surface and a back major surface, said fiber-optic faceplate comprising a plurality of optical fibers extending between said front major surface and said back major surface.

6. The flat display panel claimed in claim 5, wherein the index of refraction of said back dielectric layer is not less than the index of refraction of said phosphor layer.

7. The flat display panel claimed in claim 5 or 6, wherein said front dielectric layer is formed of diamond.

8. That flat display panel claimed in claim 7, wherein said back dielectric layer is formed of diamond.

9. The flat display panel claimed in claim 5, wherein each of said optical fibers comprises a transparent core and an outer cladding, said outer cladding having an index of refraction that is less than the index of refraction of said core, further wherein said faceplate front major surface is formed such that the ends of said cores on said faceplate front major surface protrude from said outer cladding and are curved.

10. The flat display panel claimed in claim 9, wherein the index of refraction of said back dielectric layer is not less than the index of refraction of said phosphor layer.

11. The flat display panel claimed in claim 9 or 10, wherein said front dielectric layer is formed of diamond.

12. The flat display panel claimed in claim 11, wherein said back dielectric layer is formed of diamond.

13. The flat display panel claimed in claim 1, wherein:

said front electrode layer comprises a plurality of higher conductive narrow strips, said narrow strips lying parallel to one another and separated by distances that are substantially larger than the width of each of said narrow strips;

said front dielectric layer extends into the separations between said narrow strips, a portion of each of said front dielectric layer extensions being doped such that said portions of said extensions are conductive; and said doped portions of each extension are electrically connected to an adjacent one of said narrow strips.

14. The flat display panel claimed in claim 13, wherein the index of refraction of said back dielectric layer is not less than the index of refraction of said phosphor layer.

15. The flat display panel claimed in claim 13 or 14, wherein said front dielectric layer is formed of diamond.

16. The flat display panel claimed in claim 15, wherein said back dielectric layer is formed of diamond.

17. The flat display panel claimed in claim 13, further comprising a fiber-optic faceplate located in front of said front electrode layer, said fiber-optic faceplate having a front major surface and a back major surface, said faceplate comprising a plurality of optical fibers extending between said front major surface and said back major surface.

18. The flat display panel claimed in claim 17, wherein the index of refraction of said back dielectric layer is not less than the index of refraction of said phosphor layer.

19. The flat display panel claimed in claim 17 or 18, wherein said front dielectric layer is formed of diamond.

20. The flat display panel claimed in claim 19, wherein said back dielectric layer is formed of diamond.

21. The flat display panel claimed in claim 17, wherein each of said optical fibers comprises a transparent core and an outer cladding, said outer cladding having an index of refraction that is less than the index of refraction of said core, further wherein said faceplate front major surface is formed such that the ends of said cores on said faceplate front major surface protrude from said outer cladding and are curved.

22. The flat display panel claimed in claim 21, wherein the index of refraction of said back dielectric layer is not less than the index of refraction of said phosphor layer.

23. The flat display panel claimed in claim 21 or 22, wherein said front dielectric layer is formed of diamond.

24. The flat display panel claimed in claim 23, wherein said back dielectric layer is formed of diamond.

25. A flat panel display comprising:

(a) a back electrode layer;

(b) a phosphor layer on one side of said back electrode layer;

(c) a back dielectric layer located between said back electrode layer and said phosphor layer;

(d) a front dielectric layer on the other side of said phosphor layer from said back dielectric layer; and (e) a front electrode layer on the other side of said front dielectric layer from said phosphor layer, said front electrode layer comprising a plurality of highly conductive narrow strips, said narrow strips lying parallel to one another and separated by distances that are substantially larger than the width of each of said narrow strips, said front dielectric layer extending into the separations between said narrow strips, a portion of each of said front dielectric layer extensions being doped such that said portions of said extensions are conductive, said doped portion of each extension electrically connected to an adjacent one of said narrow strips.

26. A flat display panel comprising:

(a) a back electrode layer;

(b) a front electrode layer;

(c) a phosphor layer located between said back electrode layer and said front electrode layer; and (d) a dielectric layer located between said phosphor layer and said front electrode layer, the index of refraction of said dielectric layer being not less than the index of refraction of said phosphor layer.

27. The flat display panel claimed in claim 26, further comprising a fiber-optic faceplate located on the other side of said front electrode layer from said dielectric layer, said fiber-optic faceplate having a front major surface and a back major surface, said fiber-optic faceplate comprising a plurality of optical fibers extending between said front major surface and said back major surface, wherein each of said plurality of optical fibers comprises a transparent core and an outer clad, said outer clad having an index of refraction that is less than the index of refraction of said core, further wherein the ends of said cores on said front major surface protrude from said outer cladding and are curved.

* * * * *

UNITED STATES PATENT AND TRADEMARK OFFICE
CERTIFICATE OF CORRECTION

PATENT NO. : 5,131,065

DATED : July 14, 1992

INVENTOR(S) : S.J. Briggs et al.

It is certified that error appears in the above-identified patent and that said Letters Patent is hereby corrected as shown below:

| COLUMN | LINE | |
|---|---|---|
| 2 | 68 | "plateplate" should read --faceplate-- |

Signed and Sealed this

Seventeenth Day of August, 1993

Attest:

Bruce Lehman

BRUCE LEHMAN

*Attesting Officer*

*Commissioner of Patents and Trademarks*